United States Patent
Park

(10) Patent No.: US 11,843,694 B2
(45) Date of Patent: Dec. 12, 2023

(54) SCALABLE CONTENT RESTRICTION

(71) Applicant: Comcast Cable Communications, LLC, Philadelphia, PA (US)

(72) Inventor: Kyong Park, Woodbine, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/085,262

(22) Filed: Dec. 20, 2022

(65) Prior Publication Data

US 2023/0188331 A1 Jun. 15, 2023

Related U.S. Application Data

(63) Continuation of application No. 17/187,297, filed on Feb. 26, 2021, now Pat. No. 11,563,568.

(60) Provisional application No. 62/982,459, filed on Feb. 27, 2020.

(51) Int. Cl.
*H04L 9/08* (2006.01)
*H04L 9/40* (2022.01)

(52) U.S. Cl.
CPC ............ *H04L 9/085* (2013.01); *H04L 9/0819* (2013.01); *H04L 9/0872* (2013.01); *H04L 63/107* (2013.01)

(58) Field of Classification Search
CPC ..... H04L 9/085; H04L 9/0819; H04L 9/0872; H04L 63/107; H04L 9/0897; H04L 9/0894
See application file for complete search history.

(56) References Cited

U.S. PATENT DOCUMENTS

| | | | |
|---|---|---|---|
| 6,088,454 A * | 7/2000 | Nagashima | H04L 9/3255 713/180 |
| 8,520,855 B1 | 8/2013 | Kohno et al. | |
| 9,191,200 B1 | 11/2015 | Adams et al. | |
| 9,461,821 B1 | 10/2016 | Machani et al. | |
| 9,667,416 B1 | 5/2017 | Machani et al. | |
| 11,082,220 B1 | 8/2021 | Saad et al. | |
| 11,270,012 B2 | 3/2022 | Mohammad et al. | |
| 2008/0263363 A1 | 10/2008 | Jueneman et al. | |
| 2009/0252330 A1 | 10/2009 | Patnala et al. | |
| 2010/0046739 A1 | 2/2010 | Schneider et al. | |
| 2010/0054457 A1 | 3/2010 | Schneider et al. | |
| 2012/0221865 A1 | 8/2012 | Hahn et al. | |
| 2012/0243687 A1* | 9/2012 | Li | H04L 9/085 380/277 |

(Continued)

OTHER PUBLICATIONS

Wikipedia—"Secret Sharing"—retreived from https://en.wikipedia.org/wiki/Secret_sharing on Mar. 13, 2019.

(Continued)

*Primary Examiner* — Techane Gergiso
(74) *Attorney, Agent, or Firm* — Banner & Witcoff, Ltd.

(57) ABSTRACT

Groups of devices may be prevented from accessing content by encrypting the content. A plurality of secrets associated with a decryption key may be generated using a secret sharing algorithm. The plurality of secrets may be sent to one or more groups of devices to derive the decryption key. A non-restricted subset of the groups of devices may receive one or more secrets. Devices within the non-restricted subset of the groups may be able to use one or more secrets to determine the decryption key for the content. Groups that do not receive one or more secrets may be unable to determine the decryption key for the content.

30 Claims, 7 Drawing Sheets

(56) References Cited

U.S. PATENT DOCUMENTS

| | | |
|---|---|---|
| 2013/0010966 A1 | 1/2013 | Li et al. |
| 2013/0191928 A1 | 7/2013 | Yin et al. |
| 2015/0143115 A1 | 5/2015 | Gupta et al. |
| 2015/0312759 A1* | 10/2015 | Kim ..................... H04W 12/64 |
| | | 455/411 |
| 2017/0250972 A1 | 8/2017 | Ronda et al. |
| 2019/0007205 A1 | 1/2019 | Corduan et al. |
| 2019/0238323 A1 | 8/2019 | Bunch et al. |
| 2019/0288840 A1* | 9/2019 | Gallancy ............... H04L 9/0825 |
| 2019/0342083 A1 | 11/2019 | LeSaint |
| 2019/0354972 A1 | 11/2019 | Triandopoulos et al. |
| 2020/0119917 A1 | 4/2020 | Christensen et al. |
| 2020/0259651 A1 | 8/2020 | Mohassel et al. |
| 2021/0111875 A1 | 4/2021 | Le Saint et al. |
| 2021/0112039 A1 | 4/2021 | Pinkerton et al. |
| 2021/0126903 A1 | 4/2021 | Racz et al. |
| 2021/0194677 A1 | 6/2021 | Pourzandi et al. |
| 2021/0336771 A1 | 10/2021 | Mukherjee et al. |

OTHER PUBLICATIONS

Wikipedia—"Hyperplane"—retreived from https://en.wikipedia.org/wiki/Hyperplane on Mar. 13, 2019.

Andreas Poylatzls, "Shamir's Secret Sharing—A numeric example walthrough", dated Sep. 22, 2018.

Abukari, Arnold Mashud, Edem Kwedzo Bankas, and Mohammed Iddrisu Muniru. "An Efficient Threshold Cryptography Scheme for Cloud ERP Data." (Year: 2020).

* cited by examiner

SCALABLE CONTENT RESTRICTION

CROSS-REFERENCE TO RELATED APPLICATIONS

This application is a continuation of and claims priority to U.S. patent application Ser. No. 17/187,297, filed Feb. 26, 2021, which claims the benefit of U.S. Provisional Application No. 62/982,459, filed Feb. 27, 2020, each of which is hereby incorporated by reference in its entirety.

BACKGROUND

Some network devices may be allowed access to content while other network devices may be prohibited or otherwise restricted from accessing that content. In an Internet Protocol (IP) content distribution environment, allowing and restricting access to content may result in a tune event if access rights are changed. During a tune event, a device may perform transactions with a digital rights management (DRM) license server. A tune event may result in a simultaneous DRM license request from all devices impacted by the change in access rights. The requests may be made to a DRM license server and supporting systems. The result may be a traffic storm which may overwhelm the DRM license server and supporting systems, resulting in video outage.

SUMMARY

The following presents a simplified summary of certain features. The summary is not an extensive overview and is not intended to identify key or critical elements.

Restricting an ability of one or more groups of devices to access content is described. A decryption key may be shared with groups of devices using a secret sharing algorithm. Each of the groups of devices may receive one or more secrets generated based on the secret sharing algorithm. Those secret(s) may be used to derive a decryption key. Devices in those groups may then use that derived key to decrypt content that has been encrypted using a corresponding encryption key. Devices in groups that have not received secrets, and/or that have not received a threshold quantity of secrets, may be unable to determine the encryption key, and thus may be unable to access (e.g. decrypt) the content. Systems, apparatuses, and methods described herein may permit scaling and tune time efficiency. Decryption keys and/or secrets may be delivered in advance of a content restriction event. Because keys may be received in advance of a content restriction event, content may be downloaded and decrypted without many devices reacting to the content restriction event by submitting potentially millions of requests into a key server within a short period of time.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
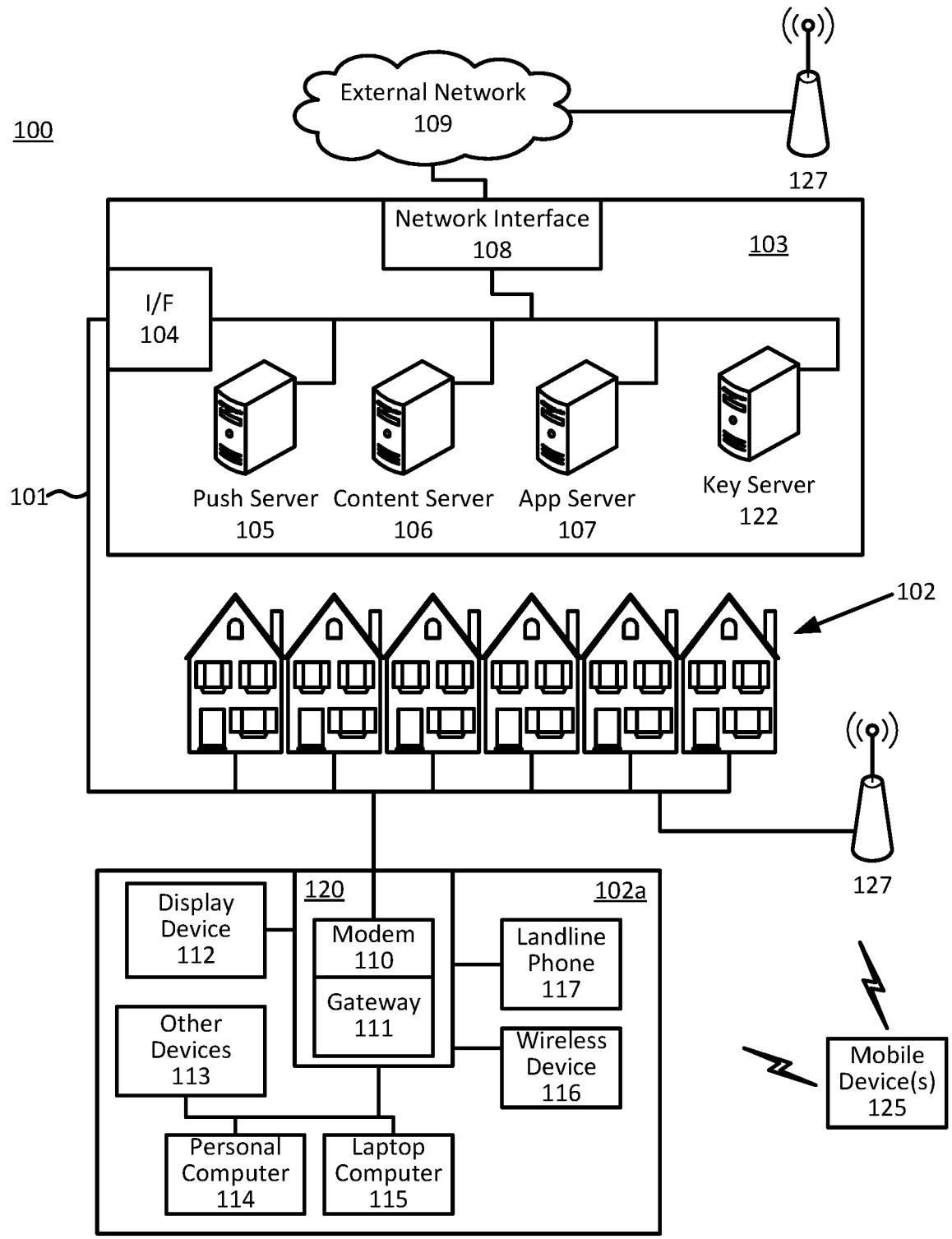
FIG. 1 shows an example communication network.

The accompanying drawings, which form a part hereof, show examples of the disclosure.

It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing device(s) configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of information for electronic program guide listings. Another application server may be responsible for monitoring user viewing habits and collecting information from that monitoring for use in selecting advertisements. Yet another application server may be responsible for formatting and inserting advertisements in a video stream being sent to devices in the premises 102 and/or to the mobile devices 125. The local office 103 may comprise additional servers, such as the key server 122 (described below), additional push, content, and/or application servers, and/or other types of servers. Although shown separately, the push server 105, the content server 106, the application server 107, the key server 122, and/or other server(s) may be combined. Also or alternatively, one or more of these and/or other servers may be part of the external network 109 and may be configured to communicate (e.g., via the local office 103) with computing devices located in or otherwise associated with one or more premises 102. The servers 105, 106, 107, and 122, and/or other servers, may be computing devices and may comprise memory storing data and also storing computer executable instructions that, when executed by one or more processors, cause the server(s) to perform steps described herein.

The key server 122 may be configured to generate encryption keys for encrypting content. The key server 122 may use a secret sharing algorithm (e.g., Shamir's secret sharing, Blakley's scheme, secret sharing using the Chinese Remainder Theorem, etc.) to determine secrets that may be used to determine an encryption key. The key server 122 may send one or more secrets to devices to enable the devices to determine the encryption key. The key server 122 may determine groups of devices. Some groups of devices may be sent one or more secrets while other groups of devices are not sent a secret. Sending a secret may include sending the secret over a secure connection (e.g., using Transport Layer Security).

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise (and/or otherwise perform operations of) a set-top box (STB), digital video recorder (DVR), a digital transport adapter (DTA), a computer server, a router, and/or any other desired computing device.

The gateway 111 may also comprise one or more local network interfaces to communicate, via one or more local networks, with devices in the premises 102a. Such devices may comprise, e.g., display devices 112 (e.g., televisions), other devices (e.g., a DVR or STB) 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use content. Content may comprise a video, a game, one or more images, software, audio, text, webpage(s), and/or other assets.

Figure 2:
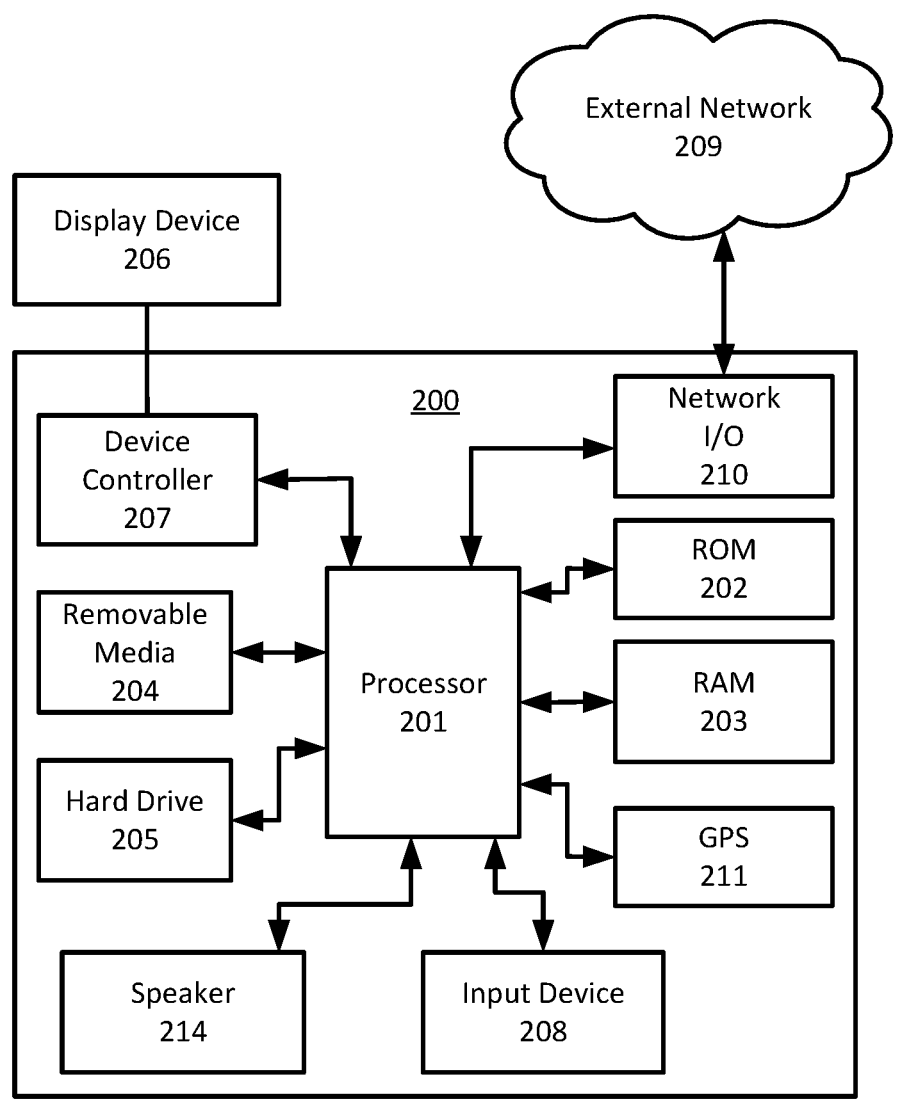
FIG. 2 shows hardware elements of a computing device.

FIG. 2 shows hardware elements of a computing device 200 that may be used to implement any of the computing devices shown in FIG. 1 (e.g., the mobile devices 125, any of the devices in the premises 102a, any of the devices shown in the local office 103, any of the wireless access points 127, any devices associated with the external network 109) and any other computing devices discussed herein (e.g., the key server 122). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to an output (e.g., display) buffer.

Figure 3:
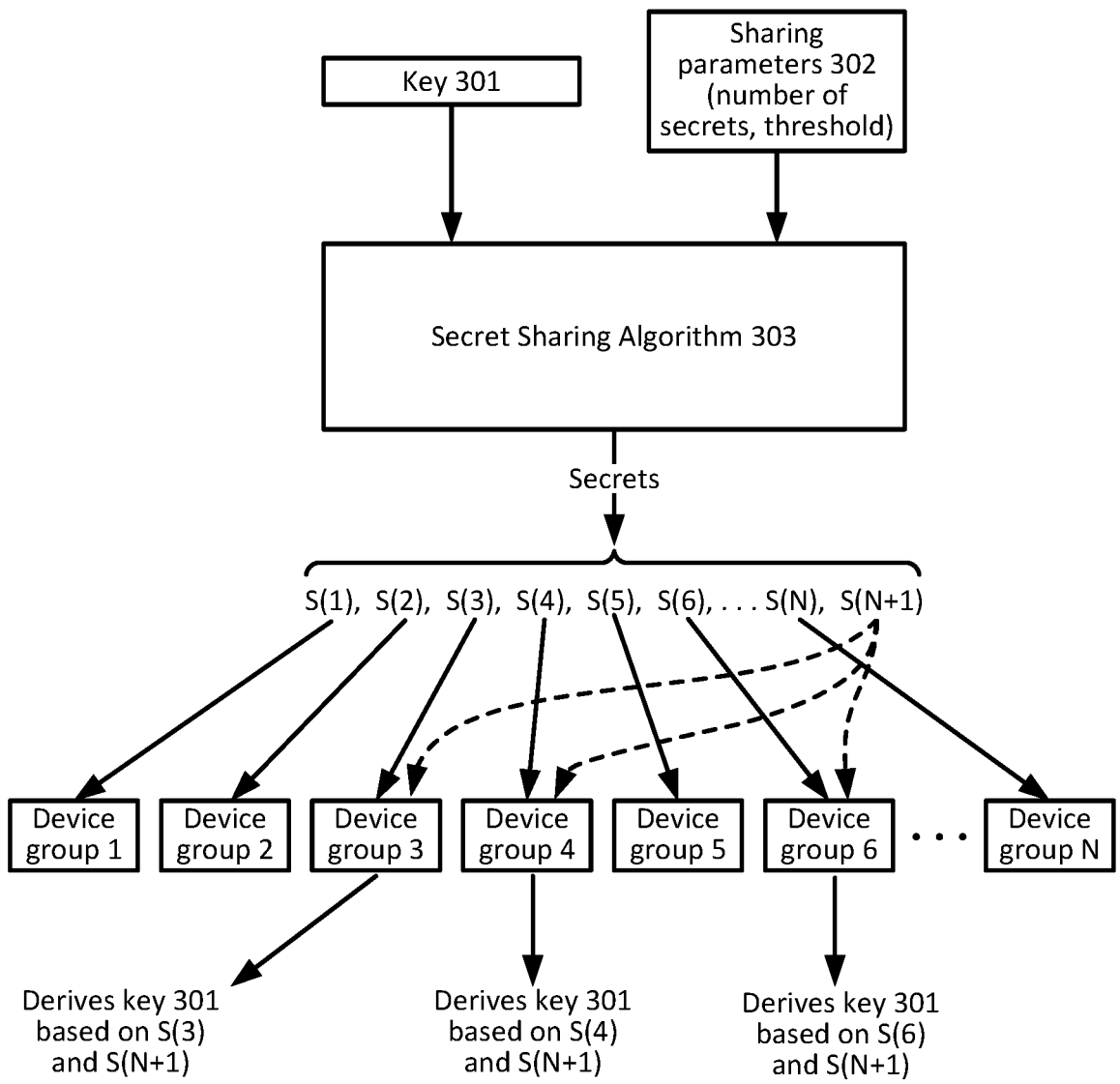
FIG. 3 shows an example system for restricting content.

FIG. 3 shows an example system for restricting content. Content may include video (e.g., a video available on a streaming service, broadcasted television programs, etc.), pictures, and/or text. The content may be stored in any format (e.g., any type of file accessible via the Internet). The content may be sent in any manner (e.g., via a service, via a broadcast, via a cable, via the Internet, etc.). The content may comprise a content item such as audio/video for programming (e.g., television shows, sporting event coverage, movies, etc.), videos uploaded to a video sharing site, commercials, or any other type of content. A content item may comprise a content that may be indicated and/or otherwise treated as a single occurrence of content (e.g., an individual movie, TV episode, a sporting match between two teams, etc.), but which may comprise multiple packets, files, and/or other types of data collections. The content may be sent by the content server 106 to devices (e.g., any device described in connection with FIG. 1 or FIG. 2).

Access to content by one or more devices may be restricted by encrypting the content using an encryption key, such as key 301. Such an access restriction may be performed if a content restriction event occurs. A content restriction event may include changing an encryption/decryption key for content to prevent one or more devices from accessing (e.g., viewing, decrypting, displaying, etc.) the content. For example, a content restriction event may include restricting devices within a zip code from accessing sporting event coverage. As an additional example, a content restriction event may include restricting devices within a time zone from accessing election results or other news from a different time zone. Devices that do not have access to the corresponding decryption key may be unable to access and/or output the content.

The key 301 may be a symmetric key or part of an asymmetric key pair. If the key 301 is a symmetric key, the key 301 may be used to encrypt and to decrypt content. If the key 301 is part of an asymmetric key pair, the key 301 may be a private key used to decrypt content encrypted with a public key associated with the private key. The encryption key may be a parameter used with a suitable encryption algorithm (e.g., AES, RC4, DES, RC5, RC6, RSA, ECC, etc.). A device may obtain the decryption key and use it to decrypt the content, which may allow the device to output the content.

A secret sharing algorithm 303 (performed, e.g., by the key server 122) may be used to generate secrets of the key 301 (e.g., decryption key). The secrets may be shares and/or portions, for example, based on and/or derived from the key 301. Additionally or alternatively, the secrets may be data-values and/or key-related values, for example, based on and/or derived from the key 301. The secrets may be generated by dividing and/or splitting the key 301, for example, using a secret sharing algorithm, such as secret sharing algorithm 303. The secret sharing algorithm 303 may comprise Shamir's secret sharing scheme, Blakley's scheme, a secret sharing algorithm that uses the Chinese Remainder Theorem, or any other suitable of secret sharing algorithm. A quantity of secrets may be generated using the secret sharing algorithm 303 and the decryption key 301. A device that receives at least a threshold quantity of those secrets (e.g., shares) may be able to use those secrets in a key derivation algorithm (e.g., Lagrange Polynomial Interpolation, etc.) to determine the key 301 (e.g., decryption key). The secrets may be sent to a quantity of devices (e.g., 5, 100, tens of thousands, millions, etc.), which may use the secrets to generate the key 301 (e.g., the decryption key). A device that receives less than the threshold quantity of secrets may be unable to determine the key 301 (e.g., decryption key). If the threshold quantity of secrets is one, the secret sent to devices may be the key 301 (e.g., decryption key) itself. The threshold quantity of secrets may be determined by the key server 122 and/or the key server 122 may receive information indicating the threshold quantity of secrets. Secrets may be smaller in terms of data size than encryption and/or decryption keys.

The key 301 may be input to the secret sharing algorithm 303 with sharing parameters 302.

The sharing parameters 302 may comprise a threshold quantity of secrets (described above) and/or a total quantity of secrets to be generated. Based on these inputs, the secret sharing algorithm 303 may generate N+1 secrets S, shown in FIG. 3 as S(1) through S(N+1). Each of the secrets S may be represented as one or more numerical values. Each of the secrets S may correspond to points on a polynomial that has the key 301 (or information that can be used to determine the key 301) as its first term. For example, in the polynomial f(x)=$a_0+a_1x+a_2x^2$, $a_0$ may represent or be indicative of the key 301, and the secrets may be points that lie on the polynomial f(x). Devices that receive the threshold quantity of secrets may be able to determine the polynomial and/or derive the decryption key.

Additionally or alternatively, each secret S may represent (e.g., comprise data that defines) a hyperplane. With a threshold quantity of secrets S, a device may be able to define a threshold quantity of hyperplanes. The intersection of the threshold quantity of hyperplanes may indicate the key 301 (e.g., decryption key). If the secrets S represent hyperplanes, devices may be able to determine the key 301 (e.g., decryption key) by determining the intersection of the hyperplanes. For example, the threshold quantity of the secrets S required to determine the key 301 (e.g., decryption key) may be three. A device may receive three secrets S, each defining a separate hyperplane. The key 301 (e.g., decryption key) may be encoded as the intersection of the three hyperplanes. The device may determine the key 301 (e.g., decryption key) by determining the intersection of the three hyperplanes.

A different one of the secrets S may be sent to each of N device groups. For example, as shown in FIG. 3, a device group 1 may receive the secret S(1), a device group 2 may receive the secret S(2), a device group 3 may receive the secret S(3), etc., with a device group N receiving the secret S(N+1). N may be any number (e.g., 4, 100, 50,000, etc.). The device groups 1 through N may be based on any of one or more characteristics as described below. Each of the device groups 1 through N may comprise multiple devices. The devices of any of the device groups 1 through N may comprise laptops, tablets, mobile devices, set top boxes, gateways, any other device described above in FIGS. 1-2, and/or any other type of computing device. Devices in each of the device groups 1 through N may be associated with specific users, user profiles, user accounts, access rights of users associated with specific devices and/or locations, etc. The device groups 1 through N may be determined by the key server 122. Additionally or alternatively, device groups 1 through N may be determined manually and/or by another device and may be sent to the key server 122. Some of the device groups 1 through N may be allowed access to content, and others of the device groups 1 through N may be restricted from accessing content, based on one or more secrets sent to those groups, as described herein.

The key server 122 may, for example, by selection of secret(s) sent to one or more groups of devices, establish restricted and non-restricted subsets of device groups. Devices in the non-restricted subset of device groups may be sent secrets that can be used to derive a key, such as the key 301. To prevent devices in the restricted subset of device groups from deriving the key 301 (e.g., the decryption key), devices in the restricted subset may be prevented from obtaining (e.g., the key server 122 may refrain from providing) sufficient secrets to derive the key 301 (e.g., the decryption key).

For example, and as shown in FIG. 3, devices in groups that receive less than the threshold quantity of secrets may be unable to determine a decryption key using a key derivation algorithm. Conversely, devices in groups that receive the threshold quantity of secrets may be able to derive the decryption key. In the example of FIG. 3, the threshold quantity of secrets is two, but any threshold may be used. If the threshold quantity is two, a single secret sent to a device may be insufficient to recover the key 301 (e.g., the decryption key). An additional secret S(N+1) may be sent to devices of a non-restricted subset of groups, thereby allowing devices in that non-restricted subset to determine the key 301 (e.g., the decryption key). In the example of FIG. 3, the additional secret S(N+1) may be sent to a non-restricted subset comprising the device group 3, the device group 4, and the device group 5. The secret S(N+1) may be sent to devices in that non-restricted subset at the same time, before, and/or after other secrets are sent to those devices. Devices in a restricted subset comprising the device group 1, the device group 2, and the device groups 6 through N may be prevented from obtaining the secret S(N+1) (e.g., one or more servers or other computing devices may refrain from sending the secret S(N+1) to devices in the restricted subset). Devices of the device group 3 may be able to determine the key 301 (e.g., the decryption key) using the secrets S(3) and S(N+1). Devices of the device group 4 may be able to determine the key 301 (e.g., the decryption key) using the keys S(4) and S(N+1). Devices of the device group 6 may be able to determine the key 301 (e.g., the decryption key) using the secrets S(5) and S(N+1). Devices of the device groups 1, 2, and 6 through N may be unable to determine the key 301 (e.g., the decryption key) because those devices may only have one secret of the secrets S, which is less than the threshold quantity of secrets required for derivation of the key 301.

The key server 122 and/or one or more other computing devices may send, to devices in a non-restricted subset, one or more secrets needed to derive a key if those devices attempt to access content decryptable with the key 301 (e.g., the decryption key). Devices in a restricted subset may be sent an indication of alternate content instead of secrets usable to derive the key 301 (e.g., the decryption key). In the example of FIG. 3, the decryption key 301 may be usable to decrypt an encrypted content item (or portion thereof) that is available to devices in the device groups 3, 4, and 6, but that is not being made available to devices of other groups (e.g., the device groups 1, 2, and 5). The device groups 1 through N may have previously been sent the secrets S(1) through S(N). If a device in one of the device groups 3, 4, and 6 attempts to access the content (e.g., by providing a user input to an interactive guide or other user interface), the device may be sent the secret S(N+1) and an indication of a network location where the encrypted content may be obtained. If a device in one of the device groups 1, 2, 5, or N attempts to access the content, that device may be sent an indication of a network location where alternate content may be obtained.

A non-restricted subset may be any quantity of device groups. A restricted subset may be any quantity of device groups. A quantity of device groups and/or of individual devices in a non-restricted subset may be greater than, the same as, or less than a quantity of device groups and/or of individual devices in a restricted subset. Restricted and/or non-restricted subsets may be determined with little notice before a content restriction goes into effect. For example, a restricted subset of device groups and/or a non-restricted subset of device groups may be determined within a short time period (e.g., a day, an hour, a minute, a few milliseconds, etc.) before a content restriction takes effect. The content restriction taking effect may comprise commencement of sending encrypted content that this decryptable using a key that may be derived using one or more secrets sent to devices in the non-restricted subset.

The non-restricted subset of groups may be determined based on proximity to an event associated with one or more content items. For example, groups corresponding to zip codes that are not within a radius (e.g., 1 mile, 5 miles, 30 miles, etc.) of an event (e.g., a sporting event) to be televised may be included in the non-restricted subset of groups. For example, groups corresponding to devices that are outside of a particular time zone may be included in the non-restricted subset of groups. A group corresponding to a premium subscription may be included in the non-restricted subset of groups.

Although a threshold of two was used in example of FIG. 3, the threshold quantity of secrets may be any quantity(e.g., 1, 3, 5, 15, 100, etc.). Some or all groups of devices may be sent more than one secret. For example, if the threshold quantity of secrets is three, some groups may be initially sent two secrets and some groups may be sent one secret. Thus some groups may need to obtain one additional secret to determine the decryption key and some groups may need to obtain two additional secrets to determine the decryption key. Some groups may be sent no secrets.

Each device in the non-restricted subset of groups may be sent a different secret corresponding to each group in the non-restricted subset to which the device belongs. Each secret may be sent after the non-restricted subset of groups is determined. The secrets may be sent to devices in advance of a content restriction event. Sending the secrets in advance of a content restriction event may prevent the devices from making a digital rights media license request after the content restriction event occurs.

The secrets may be sent to devices after the devices send a request for content. One or more secrets may be sent to a device, for example, based on or in response to a message (e.g., to the content server 106) from the device. The message may be a request for a network location of a content item. One or more secrets may be sent to all devices in a group (e.g., as part of a MPEG transport stream identified by a mapping table).

Alternatively, a secret may be a decryption key used in a key wrap scheme (e.g., AES Key Wrap, Triple DES Key Wrap, etc.). For example, an encryption key may be used to encrypt content. The corresponding decryption key may be encrypted using an encryption key corresponding to group B (e.g., Group B key-encrypting key). The decryption key may be further encrypted using an encryption key corresponding to group A (e.g., Group A key-encrypting key). To access the decryption key, a device may determine the decryption key by using the decryption key corresponding to group A followed by the decryption key corresponding to group B.

Enabling devices to determine the decryption key using secrets may improve the efficiency of a client/server system. If content is restricted (e.g., the decryption key changes for the content), an overwhelming number of devices may make a request for the decryption key, causing one or more servers to be overloaded. If authorized devices are instead sent (e.g., prior to or in connection with content requests) secrets that enable determination of the decryption key, the devices may avoid requesting the decryption key and the traffic to a server system may be reduced. Instead of sending the decryption key, sending secrets that can be used to reconstruct the decryption key may make it more difficult for the decryption key to be shared with unauthorized devices and/or users.

One or more dummy secrets may be sent to a device that is within a group that is not authorized to access content. Secrets and/or dummy secrets may be values. A dummy secret may be unhelpful for determining the decryption key. For example, the dummy secret may be a point that does not lie on the polynomial that may be used to determine the decryption key. For example, if the polynomial that may be used to determine the decryption key is $f(x)=71+73x+83x^2$, the values assigned to groups that are not within the non-restricted subset of groups may be points that are not found on the polynomial $f(x)=71+73x+83x^2$. A dummy secret may be sent to any device that is part of a group that is not authorized to access content. A device that is not able to determine the decryption key for content (e.g., a device that has received a dummy secret and/or not enough secrets to satisfy the threshold requirement) may request and/or receive alternate content. For example, a dummy secret may be a sequence of randomly generated alphanumeric characters.

A particular version of the content may be encrypted with the encryption key. The version of the content that is encrypted may be based on the quality of the content. For example, the high definition version of the content may be encrypted with the encryption key, while the standard definition of the content is not. This may prevent devices that are within a restricted subset of devices from accessing the high definition version of content while allowing them access to the standard definition version of the content. In this example, only devices within the non-restricted subset of groups may be allowed access to the high definition version of the content. For example, devices within the restricted subset may be allowed access to the standard definition version, but not the high definition version.

Some versions of sporting event broadcasts may be encrypted with the encryption key. For example, a local broadcast with announcers that support the home team may be encrypted with the encryption key so that only devices within the non-restricted subset of devices may output the local broadcast.

There may be any quantity of device groups (e.g., tens, hundreds, thousands, etc.) and a device may belong to any quantity of groups (e.g., 1, 5, 20, etc.). A device group may include a quantity of devices that share a characteristic. For example, a device group may be based on a geographic region in which a device is located. A geographic region may include an area covered by a zip code, area code, governmental boundary (e.g., city, county, state, or other boundaries), area within a radius of a landmark, etc. There may be a device group for each zip code, area code, or other geographic region. A device group may indicate a type of device. There may be separate device groups for different types of devices. For example, set top boxes, mobile devices (e.g., laptops, smartphones, tablets, etc.), infotainment devices in vehicles, etc. may each belong to different device groups. Device groups may be based on access rights (e.g., channels to which an account associated with a device has access, premium subscription purchases, etc.), feature purchases, and/or product offerings (e.g., enhanced DVR capability). Enhanced DVR may indicate that a set-top box is configured to record multiple programs at the same time. Enhanced DVR may indicate that the set-top box will continue recording an event even if the event extends past its scheduled broadcast time (e.g., if a sporting event goes into overtime). Devices that receive a signal from a particular local office, hub, and/or other network node may constitute a device group. Device groups may be based on software that devices use. For example, one device group may be generated for devices that use a particular operating system.

A device group may be based on whether an account associated with a device has purchased a quantity of features that exceeds a threshold. A device group may be generated for devices associated with users that are less likely to purchase a ticket to an event (e.g., the likelihood of purchasing a ticket is determined to be below a threshold). The likelihood of purchasing a ticket to an event may be determined based on account data of a user associated with a device. The account data may include demographic information (age, marital status, occupation, etc.). The account data may include information indicating content that the user has previously viewed and/or searched for.

If a device changes location, a server, such as the key server 122, may determine that the device belongs in a different device group than previously assigned. The server (e.g., the key server 122) may update the device group of the device accordingly. For example, the server (e.g., the key server 122) may communicate with another computing device that maintains a database of device groups and/or device identifiers (e.g., MAC address, IP address, etc.) to update the device group of the device. The server (e.g., the key server 122) may send the device one or more different secrets corresponding to the updated device group. For example, a device may send its location to the server (e.g., the key server 122) and the server (e.g., the key server 122) may determine that the device belongs in a first group based on its location. After the device's location changes, the device may send an updated location to the server (e.g., the key server 122). The server (e.g., the key server 122) may determine that the device belongs in a second group, for example, based on the updated location. The server (e.g., the key server 122) may send, to the device, a secret corresponding to the second group. The server (e.g., the key server 122) may send a signal to the device that causes the device to delete a secret corresponding to the first group.

Figure 4:
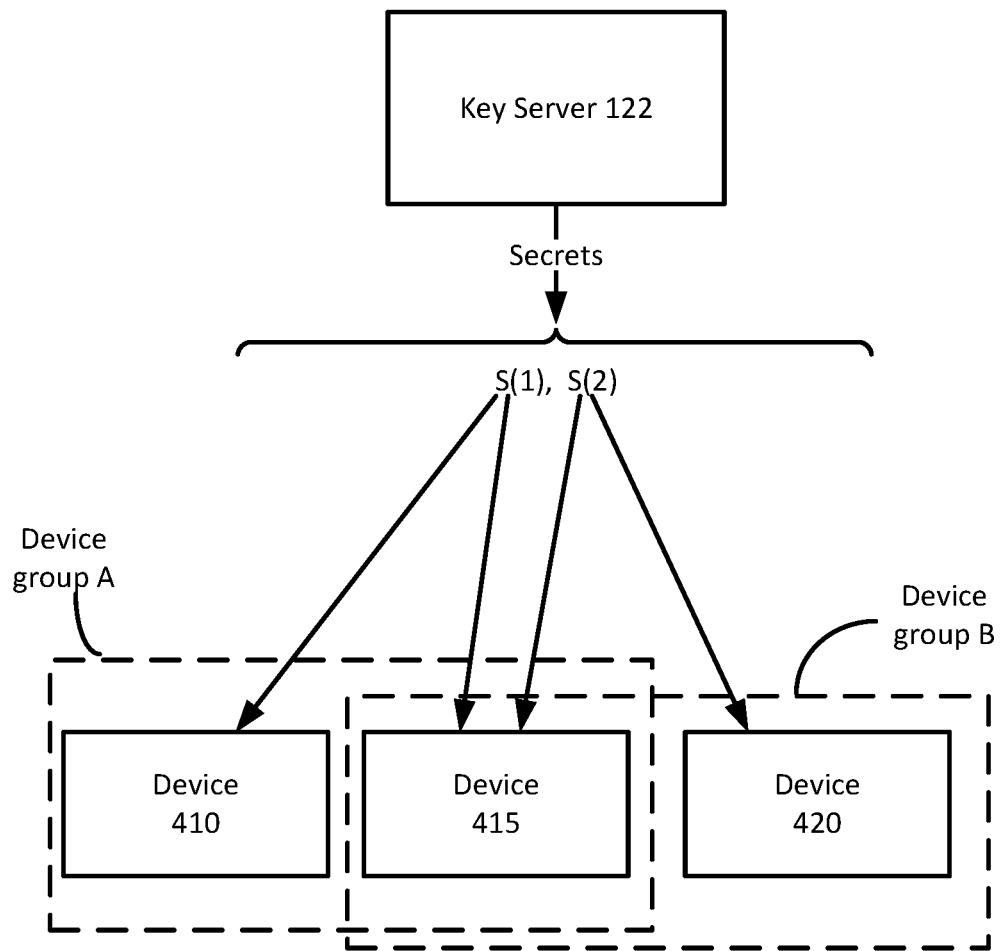
FIG. 4 shows an example grouping of devices.

FIG. 4 shows an example grouping of devices. For example, a first device group (e.g., a device group A) in FIG. 4 may represent a geographic restriction. The geographic restriction may be determined based on zip code, area code, governmental boundary (e.g., city, county, state, or other boundaries), area within a radius of a landmark, etc. A first device 410 and/or a second device 415 may be located in a first device group (e.g., the device group A). That is, both the first device 410 and the second device 510 may be located within the geographic restriction represented by the first device group (e.g., the device group A). The second device 415 and/or a third device 420 may be located in a second device group (e.g., the device group B). The second device group (e.g., the device group B) may be based on a type of a device. For example, the second device 415 and/or the third device 420 may comprise mobile devices, while the first device 410 may be a set top box and excluded from the second device group (e.g., the device group B). Thus, the first device 410 may belong solely to the first device group (e.g., the device group A), the third device 420 may belong solely to the second device group (e.g., the device group B), and the second device 415 may belong to both the first device group (e.g., the device group A) and the second device group (e.g., the device group B). Additionally or alternatively, a device group may be based on a device model. For example, a first model of a manufacturer's device may belong to one device group while a second model of the manufacturer's device may belong to a different group. For example, the second device 415 may be the latest model of a device and the first device 410 may be an older model of the device. The second device group (e.g., the device group B) may represent the latest model and, therefore, include the second device 415, while the first device 410 is not included in the second device group (e.g., the device group B).

The server (e.g., the key server 122) may use a secret sharing algorithm to generate at least secrets S(1) and S(2). The server (e.g., the key server 122) may communicate with devices within the first device group and the second device group, via a network, such as the network 209. That is, the server (e.g., the key server 122) may send secrets to the first device 410, the second device 415, and/or the third device 420. The first device 410 and the second device 415 may receive the secret S(1) because the first device 410 and the second device 410 are in the first device group (e.g., the device group A). The second device 415 and the third device 420 may receive the secret S(2) because the second device 415 and the third device 420 are both in the second device group (e.g., the device group B). If, for example, two secrets are required to determine (e.g., generate, derive) a decryption key using a key derivation algorithm, the first device 410 and the third device 420 may be unable to derive the decryption key, as they received only one secret from the key server 122, while the second device 415 may be able to derive the decryption key because it received two secrets (e.g., the secrets S(1), S(2)). Although three devices and two device groups are shown in FIG. 4, there may be any quantity of devices and/or groups. A device may belong to any quantity of groups. For example, a device may belong to one group because of the zip code it is located in, a second group because of account features that are associated with the device, and a third group because of the software installed on the device. The device may receive a separate secret for each of the groups it belongs to (the device may receive three secrets for this example). A device (e.g., the first device 410, the second device 415, and/or the third device 420) may be configured by rules that prevent it from sharing secrets with devices that are in a black out zone. Additionally or alternatively, secrets sent to each zone may be encrypted so that only devices within the zone are able to decrypt and/or use the secrets.

Figure 5:
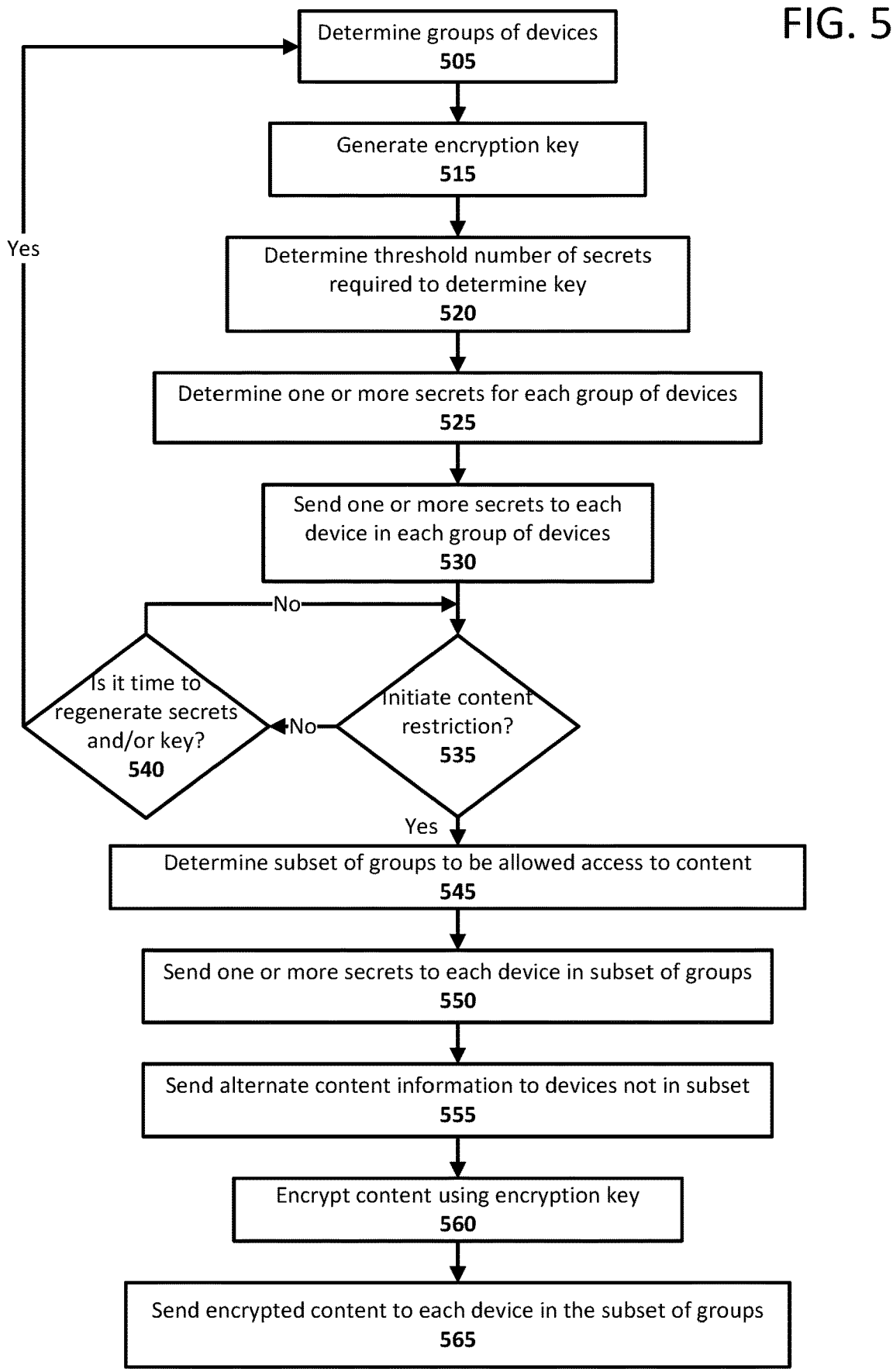
FIG. 5 is a flow chart showing an example method for restricting content.

FIG. 5 shows an example method in which devices may be sent secrets prior to a content restriction event, and some devices may be sent one or more secrets in connection with the content restriction event. Although one or more steps of the example method of FIG. 5 are described for convenience as performed by the key server 122, one, some, or all of such steps may be performed by one or more other computing devices. One or more steps of the example method of FIG. 5 may be rearranged, modified, and/or omitted.

At step 505, a server (e.g., the key server 122) may determine one or more groups of devices. The groups of devices may be determined, for example, as described above in connection with FIG. 4. In some examples, the server (e.g., the key server 122) may receive information indicating the groups of devices. Groups of devices may be determined at any time and/or multiple times during the method shown in FIG. 5. The one or more groups that each device is a part of may change, for example, based on changes associated with the device, software installed or executing on the device, and/or changes to an account, subscription, and/or features associated with the device. Device groups may be changed, for example, if a device is added and/or modified. The new or modified device may be added to a group. A device may be considered modified, for example, if features have been purchased for an account associated with the device or if software is installed and/or updated on the device. For example, a device associated with an account that upgrades to a premium membership may be added to a group associated with premium memberships. For example, a device that changes location to a different zip code may be removed from the group associated with the original zip code and added to the group associated with the zip code of the new location.

At step 515, the server (e.g., the key server 122) may generate an encryption key. For example, the key server 122 may generate the encryption key to be used with an encryption algorithm described above in connection with FIG. 3. As discussed above in connection with FIG. 3, the encryption key may be part of an asymmetric key pair and have a corresponding decryption key (e.g., private key). Alternatively, the encryption key may be a symmetric key, which may be used to encrypt and decrypt content. The encryption key may be generated using a key generation algorithm, such as RSA, ECC, or any suitable key generation algorithm. Additionally or alternatively, the encryption key may be generated using a key derivation function, a random number generator, and/or a pseudorandom number generator.

At step 520, the server (e.g., the key server 122) may determine a threshold quantity of secrets required to determine the decryption key. For example, the server may determine and/or receive information indicating a threshold quantity of secrets as described above in connection with FIG. 3. At step 525, the server (e.g., the key server 122) may determine one or more secrets (e.g., shares) for each group of devices. For example, the server may generate the one or more secrets according to a secret sharing algorithm, such as the secret sharing algorithm 303 described above in connection with FIG. 3. At step 530, the server (e.g., the key server 122) may send the one or more secrets each device in each group of devices. In the example of FIG. 3, step 530 may comprise sending the secrets S(1) through S(N) to the device groups 1 through N. The secrets may be sent via a network, such as the network 109 or the network 209. The secrets may be sent to devices in routine decryption key provisioning messages.

At step 535, the server (e.g., the key server 122) may determine whether content restriction should be initiated. The server may receive an indication that content restriction should be initiated, for example, from an authorized device (e.g., a server or other computing device maintaining and/or communicating data regarding content items and applicable restrictions on devices, users, etc. authorized to view the content items). Additionally or alternatively, the server may receive information indicating which groups should be restricted from a particular content. For example, the server (e.g., the key server 122) may receive information indicating a non-restricted subset of groups that should be sent secrets as described above in connection with FIG. 3. Content may be restricted to encourage ticket sales. For example, the server (e.g., the key server 122) may receive information indicating that a local event (sporting event, play, political debate, etc.) has not sold many tickets. Accordingly, the server (e.g., the key server 122) may determine that the local event should be restricted from being sent to local devices.

If it is determined in step 535 that content restriction should not be initiated, the method may proceed to step 540, where the server may determine whether the decryption key and/or secrets should be regenerated. The encryption and/or decryption key may be changed by the server (e.g., the key server 122) periodically. For example, the server 122 may determine that a new decryption key should be generated for content, for example, based on a predetermined period of time (e.g., one minute, one hour, one day, week, month, etc.). The server (e.g., the key server 122) may determine that a new decryption key should be generated for a particular item of content (e.g., once for each show, sporting event, etc.). If it is determined that the encryption key and/or secrets should be regenerated, steps 505-530 may be repeated. If it is determined that it is not time to regenerate the decryption key and/or secrets, step 535 may be repeated.

If it is determined in step 535 that content restriction should be initiated, the method may proceed to step 545, where the server (e.g., the key server 122) may determine a non-restricted subset of device groups. As noted above in connection with FIG. 4, the device groups may be determined based on a number of criteria, including, for example, a geographic restriction and/or device information. A non-restricted subset of one or more device groups may be determined using any of the factors discussed above. For example, the non-restricted subset of one or more device groups may be received as input from a user or another computing device. Additionally or alternatively, a restricted subset of one or more device groups may be received. The server may determine the non-restricted subset of one or more device groups from the restricted subset.

At step 550, the server (e.g., the key server 122) may send one or more secrets to each device in the non-restricted subset of groups. The one or more secrets may be secrets determined in step 525. The one or more secrets may be sent via a network (e.g., the network 109 or the external network 209). For example, the server (e.g., the key server 122) may send a secret to each device that belongs to a group within the non-restricted subset of one or more device groups. The secrets sent to each device may be encrypted, for example, using an encryption key associated with the device. The key server 122 may send a copy of the same secret (e.g., the secret S(N+1) as described above in connection with FIG. 3) to each device within the non-restricted subset of one or more device groups. Each of the secrets may be encrypted with an encryption key associated with the device that the secret is being sent to.

At step 555, the server (e.g., the key server 122) may send alternate content information to devices that are within the restricted subset of the one or more device groups. The alternate content information may indicate a location (e.g., URL, IP address, etc.) where a device may obtain and/or access non-restricted content. That is, the device may receive information about obtaining content that the device may output. For example, if a sporting event was restricted from a subset of device groups, the subset of device groups may be redirected to a show that is not restricted from the subset of groups. If a device receives alternate content information, the device may determine that it is restricted from content. Accordingly, the device may not send a request for a decryption key to the server (e.g., the key server 122) for the restricted content, for example, based on a determination that the content is restricted.

At step 560, the server (e.g., the key server 122) may encrypt the content, for example, using the encryption key generated in step 515. Additionally or alternatively, the server (e.g., the key server 122) may send the encryption key to a second server (e.g., the content server 106). The second server (e.g., the content server 106) may encrypt the content using the received encryption key. If the content had been previously encrypted with a previous encryption key, then the content may be decrypted and then encrypted with the key generated in step 515. At step 565, the server (e.g., the key server 122, the content server 106) may send the encrypted content to some or all devices (e.g., to devices requesting the content) in the subset of one or more device groups permitted to receive the content.

Figure 6:
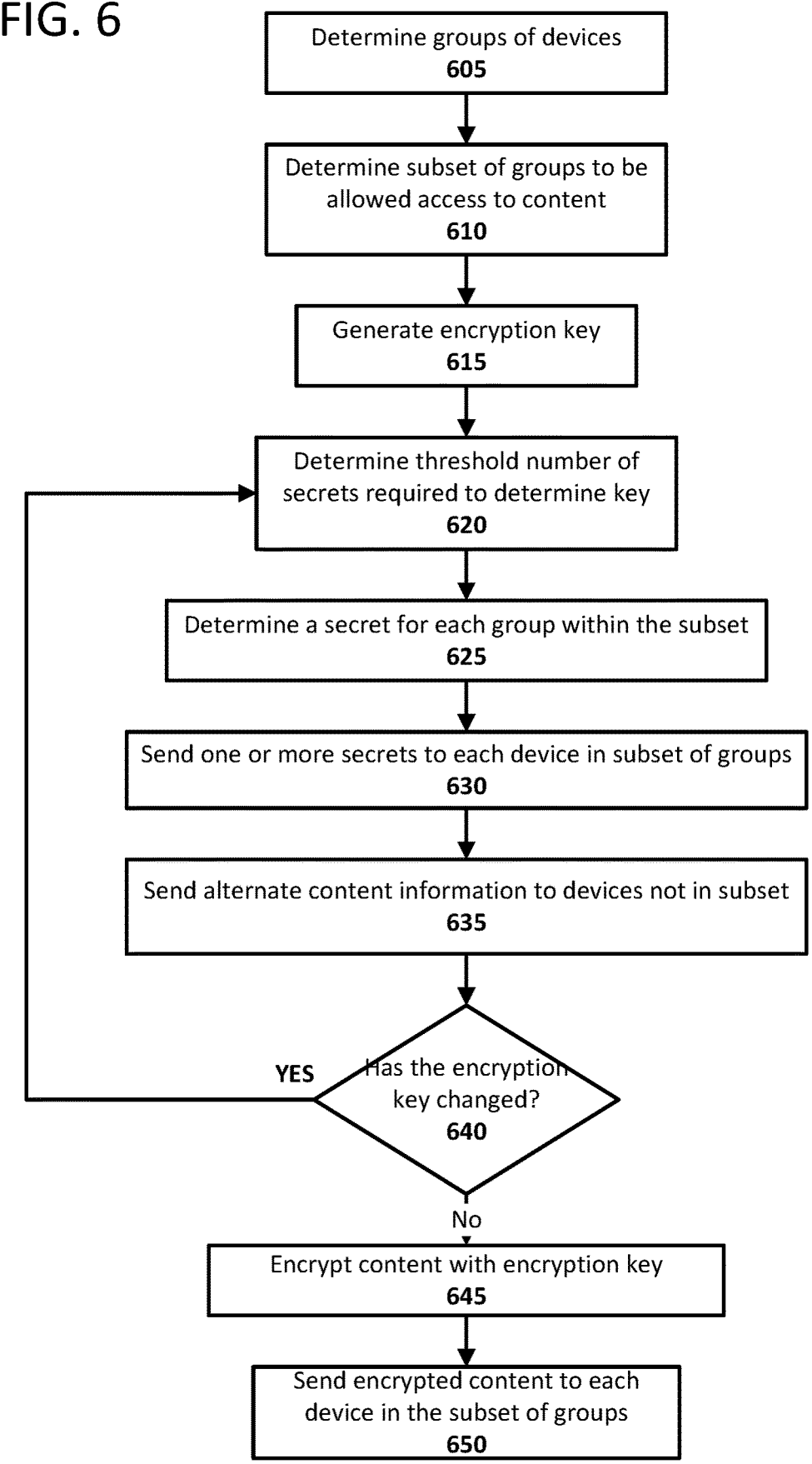
FIG. 6 is a flow chart showing an example method for restricting content.

FIG. 6 shows an example method in which devices within a non-restricted subset of device groups may be sent secrets during a content restriction event. Although one or more steps of the example method of FIG. 6 are described for convenience as performed by a server, such as the key server 122, one, some, or all of such steps may be performed by one or more other computing devices. One or more steps of the example method of FIG. 6 may be rearranged, modified, and/or omitted.

At step 605, a server (e.g., the key server 122) may determine one or more device groups. The one or more device groups may be determined as discussed in connection with step 505 of FIG. 5 and/or as discussed in connection with FIG. 3. At step 610, the server may determine a non-restricted subset of device groups. The non-restricted subset of device groups may be determined as discussed, for example, in connection with step 545 of FIG. 5 and/or in connection with FIG. 3. At step 615, the server (e.g., the key server 122) may generate an encryption key. At step 620, the server may determine a threshold quantity of secrets needed to derive a decryption key corresponding to the encryption key used to encrypt the content. At step 625, the server may determine one or more secrets for each group within the non-restricted subset of device groups determined in step 610. At step 630, the server may send the one or more secrets to each device within the non-restricted subset of device groups. For example, the device groups that are within the restricted subset of device groups may receive no secrets from the server (e.g., the key server 122). Additionally or alternatively, the device groups within the restricted subset of device groups may receive dummy secrets from the server (e.g., the key server 122). At step 635, the server may send alternate content information to devices that are in the restricted subset of device groups as described, for example, in connection with step 555 of FIG. 5 and in connection with FIG. 3. At step 640, the server may determine whether the encryption key should be changed. The encryption key may be changed by the server (e.g., the key server 122) periodically (e.g., hourly, daily, weekly, etc.). In this regard, the server (e.g., the key server 122) may generate a new encryption/decryption key for content after a predetermined period of time (e.g., after 10 minutes, one hour, one day, etc.). If the encryption key has changed, steps 620-640 may be repeated using the new encryption/decryption key.

If the server determines that the encryption key should not be changed, the method proceeds to step 645, where the server may encrypt the content using the encryption key. Additionally or alternatively, the server (e.g., the key server 122) may send the encryption key to a second server (e.g., the content server 106). The content server 106 may encrypt the content using the received encryption key. At step 650, the server (e.g., the key server 122, the content server 106) may send the encrypted content to each device in the subset of one or more device groups permitted to receive the content.

Figure 7:
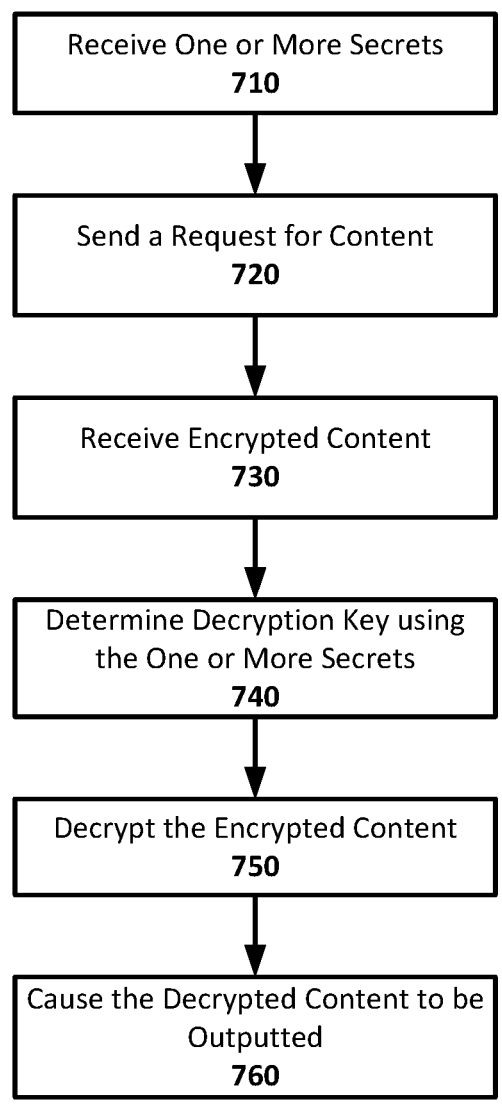
FIG. 7 is a flowchart showing an example method for decrypting content.

FIG. 7 shows an example method in which devices may decrypt content during a content restriction event. Although one or more steps of the example method of FIG. 7 are described for convenience as performed by a device, such as the display device 112 (e.g., a television), the device 113, the personal computer 114, the laptop computer 115, the wireless device 116 (e.g., wireless routers, wireless laptops, notebooks, tablets and netbooks, mobile phones, mobile televisions, PDA), the landline phone 117 (e.g. Voice over Internet Protocol—VoIP phones), the mobile device 125, and any other desired devices, one, some, or all of such steps may be performed by one or more other computing devices. One or more steps of the example method of FIG. 7 may be rearranged, modified, and/or omitted.

At step 710, a device (e.g., each device in the subset of one or more device groups) may receive one or more secrets. The device may be one or more devices of one or more device groups of a non-restricted subset. The one or more secrets may be received from a server. The one or more secrets may be shares and/or pieces that can be used to generate (derive) a decryption key. The one or more secrets may be received in advance of a content restriction event. In some examples, a first secret may be received in advance of a content restriction event and a second secret may be received at, or around, a start time of a content restriction event. Additionally or alternatively, one or more secrets may be received after the start time of a content restriction event. For example, the device may request access to the content after the start time. In this regard, one or more factors and/or criteria may have changed after the start time of the content restriction event. In an example, the device may have purchased access to the content.

At step 720, the device may send a request for content to a server. The requested content may be audio/video programming (e.g., television shows, sporting event coverage, movies, etc.), videos uploaded to a video sharing site, commercials, or any other suitable type of content. At step 730, the device may receive encrypted content. In response to the request for content, for example, the device may receive encrypted content in step 730. As noted above, the content may be encrypted due to a content restriction event. Additionally or alternatively, the content may be encrypted due to the device not having access to the content. If a device requesting content is not part of a group that is allowed to access content, the server may respond to the request with alternative content, as discussed in step 555 above.

At step 740, the device may determine, generate, and/or derive the decryption key. The decryption key may be determined, for example, using the one or more secrets received in step 710. The decryption key may be determined, for example, using a secret sharing algorithm, such as the secret sharing algorithm 303. In this regard, the device may have received two or more secrets from the server (e.g., the key server 122). Accordingly, the device may determine the decryption key using the two or more secrets. Devices that are within the restricted subset of device groups may have only received one secret and may be unable to derive the decryption key. Devices within the restricted subset of device groups may have received a resource locator for alternative content, as discussed in step 555 above, and may access the alternate content instead of determining the decryption key.

At step 750, the device may decrypt the encrypted content. For example, the device (e.g., the second device 415) may use the decryption key determined in step 740 to decrypt the encrypted content received in step 730. At step 760, the device may output the decrypted content. Outputting the decrypted content may cause the content to be displayed on the device such that a user can view the content. For example, the second device 415 may output the content to a screen or other medium for a user to view the content.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
sending, by a computing device to a plurality of devices, a first portion of a plurality of portions of an encryption key;
based on a determination that a first group of devices, of the plurality of devices, are authorized to receive first content encrypted based on the encryption key, sending, to the first group of devices and for derivation of a decryption key associated with the encryption key, a second portion of the plurality of portions of the encryption key;

sending, to the first group of devices, the first content encrypted based on the encryption key; and based on a determination that a second group of devices, of the plurality of devices, are not authorized to receive the first content encrypted based on the encryption key, sending, to the second group of devices, an indication of second content different from the first content.

2. The method of claim 1, further comprising:
generating the plurality of portions of the encryption key based on an indication of a quantity of portions required to derive the decryption key.

3. The method of claim 1, further comprising:
determining that the first group of devices are authorized to receive first content encrypted based on the encryption key based on the first group of devices being associated with at least one of: a geographic location; a type of device; or a time zone.

4. The method of claim 1, wherein:
the plurality of portions corresponds to a plurality of hyperplanes; and
the decryption key corresponds to an intersection of the plurality of hyperplanes.

5. The method of claim 1, wherein:
each of the plurality of portions is associated with a point of a polynomial; and
the decryption key corresponds to a term of the polynomial.

6. The method of claim 1, wherein the first portion and the second portion are sent at different times.

7. The method of claim 1, further comprising:
sending the indication of second content different from the first content based on at least one of: a geographic restriction; a device restriction; or a time restriction.

8. The method of claim 1, wherein the indication of second content different from the first content comprises a resource locator associated with the second content, and the method further comprises:
receiving, from at least one of the second group of devices and based on the resource locator, a request to access the second content.

9. The method of claim 1, wherein the encryption key and the decryption key are the same key.

10. The method of claim 1, wherein the first content is associated with a content restriction event comprising at least one of: a sporting event, a play, a political debate, or an election result.

11. A computing device comprising:
one or more processors; and
memory storing instructions that, when executed by the one or more processors, cause the computing device to:
send, to a plurality of devices, a first portion of a plurality of portions of an encryption key;
based on a determination that a first group of devices, of the plurality of devices, are authorized to receive first content encrypted based on the encryption key, send, to the first group of devices and for derivation of a decryption key associated with the encryption key, a second portion of the plurality of portions of the encryption key;
send, to the first group of devices, the first content encrypted based on the encryption key; and
based on a determination that a second group of devices, of the plurality of devices, are not authorized to receive the first content encrypted based on the encryption key, send, to the second group of devices, an indication of second content different from the first content.

12. The computing device of claim 11, wherein the instructions, when executed by the one or more processors, cause the computing device to:
generate the plurality of portions of the encryption key based on an indication of a quantity of portions required to derive the decryption key.

13. The computing device of claim 11, wherein the instructions, when executed by the one or more processors, cause the computing device to determine that the first group of devices are authorized to receive first content encrypted based on the encryption key based on the first group of devices being associated with at least one of: a geographic location; a type of device; or a time zone.

14. The computing device of claim 11, wherein:
the plurality of portions corresponds to a plurality of hyperplanes; and
the decryption key corresponds to an intersection of the plurality of hyperplanes.

15. The computing device of claim 11, wherein:
each of the plurality of portions is associated with a point of a polynomial; and
the decryption key corresponds to a term of the polynomial.

16. The computing device of claim 11, wherein the instructions, when executed by the one or more processors, cause the computing device to send the first portion and the second portion at different times.

17. The computing device of claim 11, wherein the instructions, when executed by the one or more processors, cause the computing device to send the indication of second content different from the first content based on at least one of: a geographic restriction; a device restriction; or a time restriction.

18. The computing device of claim 11, wherein the indication of second content different from the first content comprises a resource locator associated with the second content, wherein the instructions, when executed by the one or more processors, cause the computing device to receive, from at least one of the second group of devices and based on the resource locator, a request to access the second content.

19. The computing device of claim 11, wherein the encryption key and the decryption key are the same key.

20. The computing device of claim 11, wherein the first content is associated with a content restriction event comprising at least one of: a sporting event, a play, a political debate, or an election result.

21. A non-transitory computer-readable medium storing instructions that, when executed, configure a computing device to:
send, to a plurality of devices, a first portion of a plurality of portions of an encryption key;
based on a determination that a first group of devices, of the plurality of devices, are authorized to receive first content encrypted based on the encryption key, send, to the first group of devices and for derivation of a decryption key associated with the encryption key, a second portion of the plurality of portions of the encryption key;
send, to the first group of devices, the first content encrypted based on the encryption key; and
based on a determination that a second group of devices, of the plurality of devices, are not authorized to receive the first content encrypted based on the encryption key, send, to the second group of devices, an indication of second content different from the first content.

22. The non-transitory computer-readable medium of claim 21, wherein the instructions, when executed, configure the computing device to:
generate the plurality of portions of the encryption key based on an indication of a quantity of portions required to derive the decryption key.

23. The non-transitory computer-readable medium of claim 21, wherein the instructions, when executed, configure the computing device to determine that the first group of devices are authorized to receive first content encrypted based on the encryption key based on the first group of devices being associated with at least one of: a geographic location; a type of device; or a time zone.

24. The non-transitory computer-readable medium of claim 21, wherein:
the plurality of portions corresponds to a plurality of hyperplanes; and
the decryption key corresponds to an intersection of the plurality of hyperplanes.

25. The non-transitory computer-readable medium of claim 21, wherein:
each of the plurality of portions is associated with a point of a polynomial; and
the decryption key corresponds to a term of the polynomial.

26. The non-transitory computer-readable medium of claim 21, wherein the instructions, when executed, configure the computing device to send the first portion and the second portion at different times.

27. The non-transitory computer-readable medium of claim 21, wherein the instructions, when executed, configure the computing device to send the indication of second content different from the first content based on at least one of: a geographic restriction; a device restriction; or a time restriction.

28. The non-transitory computer-readable medium of claim 21, wherein the indication of second content different from the first content comprises a resource locator associated with the second content, wherein the instructions, when executed, configure the computing device to receive, from at least one of the second group of devices and based on the resource locator, a request to access the second content.

29. The non-transitory computer-readable medium of claim 21, wherein the encryption key and the decryption key are the same key.

30. The non-transitory computer-readable medium of claim 21, wherein the first content is associated with a content restriction event comprising at least one of: a sporting event, a play, a political debate, or an election result.

* * * * *

UNITED STATES PATENT AND TRADEMARK OFFICE
CERTIFICATE OF CORRECTION

| | |
|---|---|
| PATENT NO. | : 11,843,694 B2 |
| APPLICATION NO. | : 18/085262 |
| DATED | : December 12, 2023 |
| INVENTOR(S) | : Kyong Park |

It is certified that error appears in the above-identified patent and that said Letters Patent is hereby corrected as shown below:

In the Specification

Column 11, Line 32:
Delete "510" and insert --415--

Column 12, Line 1:
Delete "410" and insert --415--

Signed and Sealed this
Third Day of December, 2024

*Katherine Kelly Vidal*

Katherine Kelly Vidal
*Director of the United States Patent and Trademark Office*